No. 708,915. Patented Sept. 9, 1902.
W. D. OTT & F. L. PREBYL.
GATE.
(Application filed Apr. 12, 1902.)
(No Model.) 2 Sheets—Sheet 1.
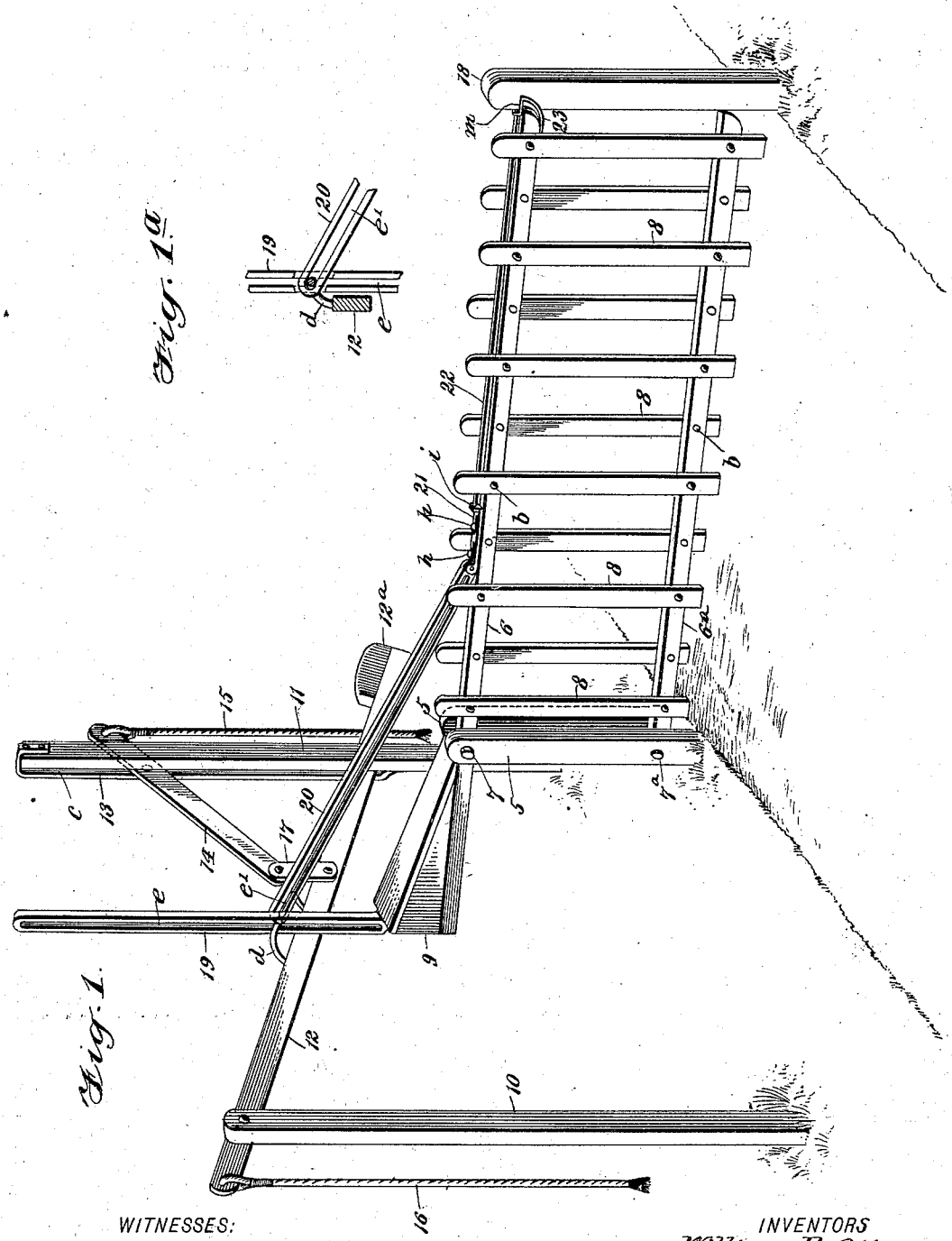
WITNESSES:
INVENTORS
William D. Ott
Frank L. Prebyl
BY
ATTORNEYS.

No. 708,915. Patented Sept. 9, 1902.
W. D. OTT & F. L. PREBYL.
GATE.
(Application filed Apr. 12, 1902.)
(No Model.) 2 Sheets—Sheet 2.
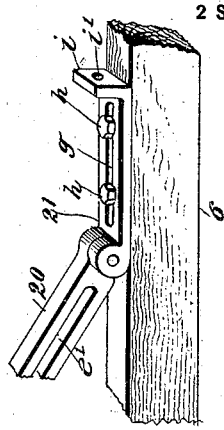
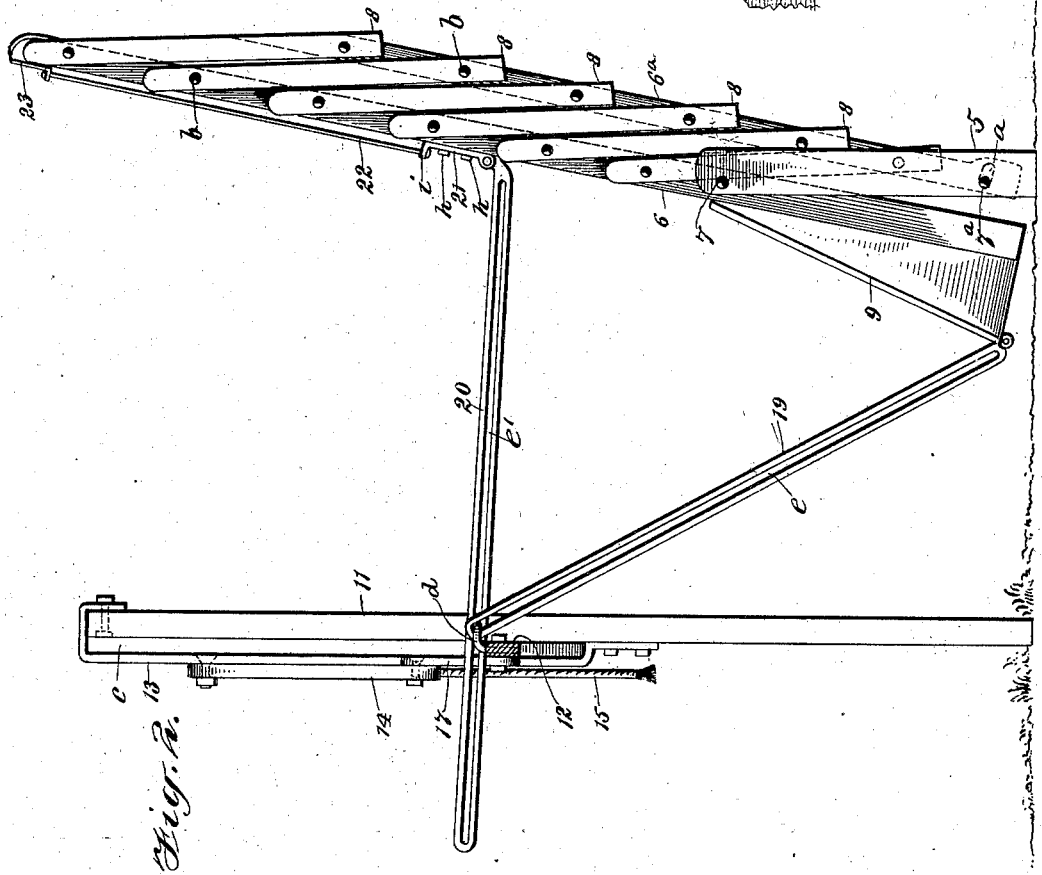
WITNESSES:
INVENTORS
William D. Ott
Frank L. Prebyl
BY
ATTORNEYS

UNITED STATES PATENT OFFICE.

WILLIAM DUDLEY OTT AND FRANK LEWIS PREBYL, OF RIVERSIDE, IOWA.

GATE.

SPECIFICATION forming part of Letters Patent No. 708,915, dated September 9, 1902.

Application filed April 12, 1902. Serial No. 102,532. (No model.)

*To all whom it may concern:*

Be it known that we, WILLIAM DUDLEY OTT and FRANK LEWIS PREBYL, citizens of the United States, and residents of Riverside, in the county of Washington and State of Iowa, have invented new and useful Improvements in Gates, of which the following is a full, clear, and exact description.

This invention relates to a class of gates employed to guard a highway or a passage from one inclosure on a farm to another, and has for its object to provide novel and effective means for conveniently operating the gate so as to open or close it.

The invention consists in the novel construction and combination of parts, as is hereinafter described, and defined in the appended claims.

Reference is to be had to the accompanying drawings, forming a part of this specification, in which similar characters of reference indicate corresponding parts in all the figures.

Figure 1 is a perspective view of a gate embodying our invention, showing the gate closed. Fig. 1ª is a partly-sectional detail view of certain features of the improvement hereinafter more particularly described. Fig. 2 is a side elevation of the gate and the novel operative connections therefor adjusted to actuate and hold the gate open, and Fig. 3 is an enlarged perspective view of a latch-bolt-operating detail employed.

At one side of a roadway or passage to be guarded by the gate two posts 5 are erected side by side and spaced apart in parallel planes, so as to afford a vertical slot between them for the reception of the upper and lower gate-bars 6 6ª. Transverse bolt-holes are formed in the twin posts 5 near their upper ends and in the portion of said posts near the ground-level for the reception of the pivot-bolts 7 7ª. The lower gate-bar 6ª is transversely slotted, as indicated at *a* by dotted lines in Fig. 2, to receive the lower pivot-bolt 7ª, and at a proper distance from the ends of the upper gate-bar 6 a transverse perforation is formed therein to loosely receive the upper pivot-bolt 7. The bars 6 6ª are held spaced apart in parallel planes by a plurality of palings 8, that are held spaced apart and disposed alternately upon each side of said gate-bars by the pivot-bolts *b*. Upon the shorter end portion of the upper gate-bar 6 a weight-block 9 is mounted or secured, having heft sufficient to counterbalance the weight of the longer portion of the upper gate-bar 6, the palings 8, and the lower gate-bar 6ª. The weight-block 9 may be of solid metal or be in box form for reception of weighty material sufficient to serve as a counterbalance to the gate proper.

It will be evident that by the pivotal connection of the palings 8 to the bars 6 6ª the gate may be rocked upward on the pivot-bolts 7 7ª and the palings 8 be disposed close together, as shown in Fig. 2, the upward movement of the gate serving to open a passage that it had previously closed.

Two stanchions 10 11 of nearly similar dimensions are planted in the ground respectively at each side of the twin posts 5 and rearward thereof, said stanchions being erected in the same vertical plane and preferably at an equal distance from the posts 5. Upon the stanchion 10, which may be somewhat shorter than the other one, a lever-bar 12 is pivoted a short distance from one end of said lever-bar. A guide-strip 13 is held upon the stanchion 11 by an engagement of its ends therewith and employment of securing-bolts or the like, as shown in Fig. 2, whereby an upright slot *c* is afforded between the stanchion and the guide-strip for reception of the lever-bar 12, which is adapted to rock loosely in said slot. The end portion of the lever-bar 12 that extends through the slot *c* and away from the nearest post 5 is weighted by a gravity-block 12ª, as shown in Fig. 1, this block by its heft serving to normally depress said end of the lever-bar, so that the bar seats upon the offset in the guide-strip 13 where the lower end of said strip has engagement with a side of the stanchion 11. A rocking lever 14 is held upon the stanchion 11 at a suitable point above the lever-bar 12, said lever 14 being located near one end upon the outer side of the guide-strip and pivoted upon said strip, as indicated in Figs. 1 and 2. Upon the end of the rocking lever 14 that projects outward and above the gravity-block 12ª one end of a pull-cord 15 is attached, the cord hanging pendent, so as to be readily reached from the ground, and a like pendent pull-cord 16 hangs from the outer end of the lever-bar 12 nearest to the stanchion 10. A link-plate 17 is pivoted at its ends, respectively, upon the inner end of the rocking lever 14 and the lever-bar 12 near its center, and it will be seen that by this construction a downward pull on the pendent cord 16 will elevate the gravity-block 12$^a$ and correspondingly raise the inner end of the rocking lever 14 and also that the weight of the block 12$^a$ will by depression of the lever-bar normally raise the outermost end of the rocking lever when pull on the cord 15 is relaxed, as shown in Fig. 1.

Near the end of the gate farthest from the posts 5 when the gate is in a horizontal position, as shown in Fig. 1, a latching-post 18 is erected, said post having clearance from the outer ends of the gate-bars 6 6$^a$.

Upon the end of the weight block or box 9 farthest from the upper pivot-bolt 7 the lower end of a longitudinally-slotted tilting bar 19 is hinged, so as to adapt the bar to project upward and lie close to the lever-bar 12, to which it is loosely connected by the looped arm $d$, which projects upward and laterally from the lever-bar and loosely engages its transverse portion within a longitudinal slot $e$ in the tilting bar. A slotted connecting-rod 20 is loosely engaged in its longitudinal slot $e'$ with the looped arm $d$, that passes therethrough, the outer end of the slot $e'$ contacting with the looped arm when the connecting-rod is forwardly adjusted, as will now be explained. The rod 20 projects from the bent arm $d$ forwardly over the gate-bar 6 and is pivoted by its forward end upon the rear end of a slide-plate 21, seated upon and held to slide on the upper side of the gate-bar 6, as clearly shown in Figs. 1 and 3. The plate 21 has a longitudinal slot $g$ therein loosely engaged by the spaced stud-bolts $h$, which pass through the slot $g$ into the gate-bar and have their heads in loose contact with the slide-plate, so that the plate 21 is permitted to have longitudinal sliding movement and is held from displacement on the gate-bar 6. At the forward end of the slide-plate 21 a flange $i$ is turned upward thereon, the flange having a perforation $i'$ for the accommodation of one end of a pull-bar 22, loosely held therein. The body of the pull-bar 22 extends to the forward end of the gate-bar 6 and is connected at the forward extremity thereof with a spring-latch 23, carried by the gate-bar so as to project in advance of it and adapted to automatically enter a notch $m$, formed in the adjacent side of the post 18, when the gate is lowered into a horizontal position, as shown in Fig. 1.

In operation if the gate is closed or horizontally positioned, as shown in Fig. 1, the lever-bar 12 and rocking lever 14 will have their outer ends inclined upwardly and the rearmost end of the connecting-rod 20 will be drawn upon, so that the rear end of the slot $e$ will loosely contact with the looped arm $d$, as indicated in Fig. 1. It will be seen that to open the gate a quick pull and manual release of either of the pendent cords 15 16 will first draw the pull-bar 22 rearward, so as to release the latch 23 from the notch $m$ in the post 18 and consecutively tilt the gate upward. The impetus given to the gate by a manipulation of one of the cords 15 16, as described, serves to dispose the gate in a nearly upright position, this being further facilitated by the slotted engagement of the lower gate-bar 6$^a$ with the pivot-bolt 7$^a$, which allows the gate to freely rock upon the upper pivot-bolt 7 until the bolt 7$^a$ contacts with the rear end of the transverse slot $a$, as indicated by dotted lines in Fig. 2.

It will be seen that when the gate is folded together, and consequently disposed in a nearly upright position, the weight of the connecting-rod 20 and tilting bar 19 serves to prevent the gate from premature descent; but if the gate is to be designedly closed a quick pull on either of the cords 15 16 will rock the weight block or box 9 upwardly by reason of contact had by the looped arm $d$ with the upper end of the slot $e'$ in the tilting bar 19 when the weight-block is in completely-lowered condition. The quick depression of the outer end of the lever-bar 12 or rocking lever 14 will elevate the bent arm $d$ considerably and with suddenness, so that the rockable movement of the gate will overcome inertia of its parts and the gate will be projected outward and downward until it is latched fast to the post 18 by means already described.

Having thus described our invention, we claim as new and desire to secure by Letters Patent—

1. The combination with a foldable slatted gate held to rock on a post and counterbalanced thereon, of means for operating said gate, comprising a rockably-supported lever, a tilting bar jointed by one end on an end of the gate, a connecting-rod hinged on the upper portion of the gate between its ends, the tilting bar and connecting-rod crossing each other, and a projection on the lever adapted to loosely connect it with the bar and rod, so as to actuate them and rock the gate to open and close it when the lever is rocked.

2. The combination with a post, two parallel bars pivoted near like ends on the upper and lower portions of the post, the lower parallel bar having a transverse slot near one end which loosely receives the lower pivot-bolt, a series of spaced palings pivoted on the gate-bars, and a counterbalance on a projecting end of the upper gate-bar, of a slotted tilting bar hinged by one end on the weighted end of the upper gate-bar, a slotted connecting-rod held to rock by one end on the upper gate-bar between its ends, a rockably-supported lever-bar having a projection thereon which loosely engages the slots in the connecting-rod and tilting bar, and means to rock the lever.

3. The combination with a post, and a gate comprising two parallel bars pivoted upon the post, the upper bar being extended to receive a counterbalance-weight, of a plurality of spaced palings pivoted upon the gate-bars, and operating means for the gate, comprising two upright spaced stanchions, a lever-bar pivoted on one stanchion and held to rock at the side of the other stanchion, a rocking lever pivoted on the last-mentioned stanchion above the lever-bar, a link loosely connecting the rocking lever with the lever-bar between the stanchions, a slotted tilting bar hinged upon the weight-block or upper gate-bar extension, a slotted connecting-rod pivoted by one end on the upper bar of the gate, and loosely engaged in its slot by a bent arm mounted upon the lever-bar which arm also engages in the slot in the tilting bar, and means pendent from the outer ends of the lever-bar and the rocking lever, for manually operating the gate mechanism to open or close it.

4. In a device of the character described, the rockably-supported gate, a counterbalance therefor, a tilting bar held loosely by one end on the counterbalanced end of the gate, a connecting-rod hinged by one end on the gate and crossing the tilting bar, a rockable lever, and means to loosely connect the lever with the tilting bar and connecting-rod.

In testimony whereof we have signed our names to this specification in the presence of two subscribing witnesses.

WILLIAM DUDLEY OTT.
FRANK LEWIS PREBYL.

Witnesses:
FRANK DANTRENONT,
CHARLES S. GRANT.